United States Patent
Orii

(10) Patent No.: US 8,033,595 B2
(45) Date of Patent: Oct. 11, 2011

(54) VEHICLE REINFORCING STRUCTURE

(75) Inventor: Taku Orii, Fujisawa (JP)

(73) Assignee: Isuzu Motors Limited, Tokyo (JP)

(*) Notice: Subject to any disclaimer, the term of this patent is extended or adjusted under 35 U.S.C. 154(b) by 335 days.

(21) Appl. No.: 12/514,711

(22) PCT Filed: Nov. 19, 2007

(86) PCT No.: PCT/JP2007/072403
§ 371 (c)(1),
(2), (4) Date: May 13, 2009

(87) PCT Pub. No.: WO2008/062763
PCT Pub. Date: May 29, 2008

(65) Prior Publication Data
US 2010/0038930 A1 Feb. 18, 2010

(30) Foreign Application Priority Data
Nov. 24, 2006 (JP) ................................. 2006-317793

(51) Int. Cl.
*B60J 7/00* (2006.01)
(52) U.S. Cl. ........... 296/190.08; 296/180.1; 296/193.06; 296/30; 280/801.1

(58) Field of Classification Search ............. 296/190.08, 296/180.1, 193.06, 30; 280/801.1
See application file for complete search history.

(56) References Cited

U.S. PATENT DOCUMENTS

| 5,478,116 A * | 12/1995 | Jarocki et al. ................. 280/808 |
| 5,658,038 A * | 8/1997 | Griffin ........................ 296/180.2 |
| 7,950,725 B2 * | 5/2011 | Murakami et al. ....... 296/190.03 |

FOREIGN PATENT DOCUMENTS

| JP | 58-050074 U | 4/1983 |
| JP | 06-067217 U | 9/1994 |

* cited by examiner

Primary Examiner — Joseph Pape

(57) ABSTRACT

A reinforcement member 30 integratedly includes a top surface 31, a rear surface 32, a first side 33, and a second side 34. The top surface 31 has an air deflector attaching portion 35. An air deflector arranged on top of a roof panel 2 is attachable to the air deflector attaching portion 35. The second side 34 includes a base 40 and a seatbelt anchor attaching portion 41. The base 40 is formed in approximately the same plane as the first side 33. The seatbelt anchor attaching portion 41 extends inward from the base 40 along the vehicle width and is in contact with a rear pillar inner section. A seatbelt anchor arranged on the inner side of the rear pillar inner section is attachable to the air deflector attaching portion 41.

1 Claim, 3 Drawing Sheets

VEHICLE REINFORCING STRUCTURE

TECHNICAL FIELD

The present invention relates to a vehicle reinforcing structure, which reinforces a cab using a reinforcement member.

BACKGROUND ART

A structure provided with a seatbelt anchor reinforcing board for attaching a seatbelt anchor and reinforcing an attaching portion thereof in a closed space between a side panel outer section and a rear pillar inner section is disclosed in Japanese Unexamined Utility Model Publication No. Hei 6-67217.
[Patent Document 1] Japanese Unexamined Utility Model Publication No. Hei 6-67217

DISCLOSURE OF INVENTION

Problem to be Solved by the Invention

When placing a component such as an air deflector on a roof panel of a cab, an air deflector reinforcing board, which is for attaching the air deflector to the inside of a side panel outer section and reinforcing an attaching portion thereof, may be provided. Moreover, a corner reinforcing board for reinforcing a roof panel, the side panel outer section, and a back panel may be provided at a connecting portion thereof.

However, with this structure, the respective reinforcing boards are reinforcing the cab independently. As a result, reinforcement may not effectively be carried out, and stress may be concentrated near the boundaries of the respective reinforcing boards.

Therefore, the present invention is created in consideration of the above-given actual conditions, and aims to provide a reinforcing structure allowing effective reinforcement of a cab.

Means of Solving the Problem

The present invention is a vehicle reinforcing structure, which reinforces a cab using a reinforcement member, where the cab includes a roof panel, a side panel outer section, a rear pillar inner section, and a back panel.

The side panel outer section includes a side panel outer top surface, a side panel outer upper side, a rear pillar outer side, and a rear pillar outer rear surface. The side panel outer top surface extends outward along the vehicle width and is joined to an outer edge of the roof panel in the vehicle width direction. The side panel outer upper side bends downward from an outer edge of the side panel outer top surface along the vehicle width and partitions the top of a door opening. The rear pillar outer side extends downward continuing from an outer edge of the side panel outer upper side and partitions the rear of the door opening. The rear pillar outer rear surface bends and extends inward from a trailing edge of the rear pillar outer side.

The rear pillar inner section is arranged facing the inner side of the rear pillar outer side, forming a closed space with the rear pillar outer side, and fixed to the side panel outer section.

The back panel stands along the vehicle width at the rear of the roof panel and the side panel outer section. The back panel is joined to a trailing edge of the roof panel and to the inner edge of the rear pillar outer rear face in the vehicle width direction.

The reinforcement member includes a top surface, a back surface, a first side, and a second side, which are integratedly formed as a single body.

The top surface is arranged facing the bottom of the side panel outer top surface and fixed to the side panel outer top surface. The back surface is arranged facing the front surface of the rear pillar outer rear surface, fixed to at least either the side panel outer section or the rear pillar inner section, and bends and extends downward from the back edge of the top surface. The first side is arranged facing the inner surface of the side panel outer upper side, bending and extending downward from the outer edge of the top surface along the vehicle width. The second side is arranged facing the inner surface of the rear pillar outer side, fixed to at least either the side panel outer section or the rear pillar inner section, and bends and extends forward from the outer edge of the rear surface.

The top surface has a first attaching portion. An attaching component arranged on top of a roof panel is attachable to the first attaching portion. The second side includes a base and a second attaching portion. The base is formed in approximately the same plane as the first side. The second attaching portion extends inward from the base along the vehicle width and is in contact with a rear pillar inner section. A seatbelt anchor arranged on the inner side of the rear pillar inner section is attachable to the second attaching portion.

With this structure, the first attaching portion supports the attaching component arranged on top of the roof panel, and the second attaching portion supports the seatbelt anchor arranged on the inner side of the rear pillar inner section. The first attaching portion is reinforced by the first side and the back surface, and the second attaching portion is reinforced by the base. Moreover, the top surface, the back surface, the first side, and the second side are integratedly formed as a single body, and the second side and the base are formed in approximately the same plane as the first side. Therefore, a burden from the attaching component and the seatbelt anchor may be dispersed in three directions of front and back, up and down, and vehicle width (left and right) and supported, and stress concentration may be suppressed. In addition, strong reinforcement of the corner portion of the cab is possible. Accordingly, effective reinforcement of the cab is possible.

Moreover, since support of the attaching component, support of the seatbelt anchor, and reinforcement of the corner portion may be carried out by a single reinforcement member, reduction in number of components and reduction in number of attachment processes is possible.

Result of Invention

According to the present invention, effective reinforcement of the cab is possible.

DESCRIPTION OF REFERENCE NUMERALS

Figure 1:
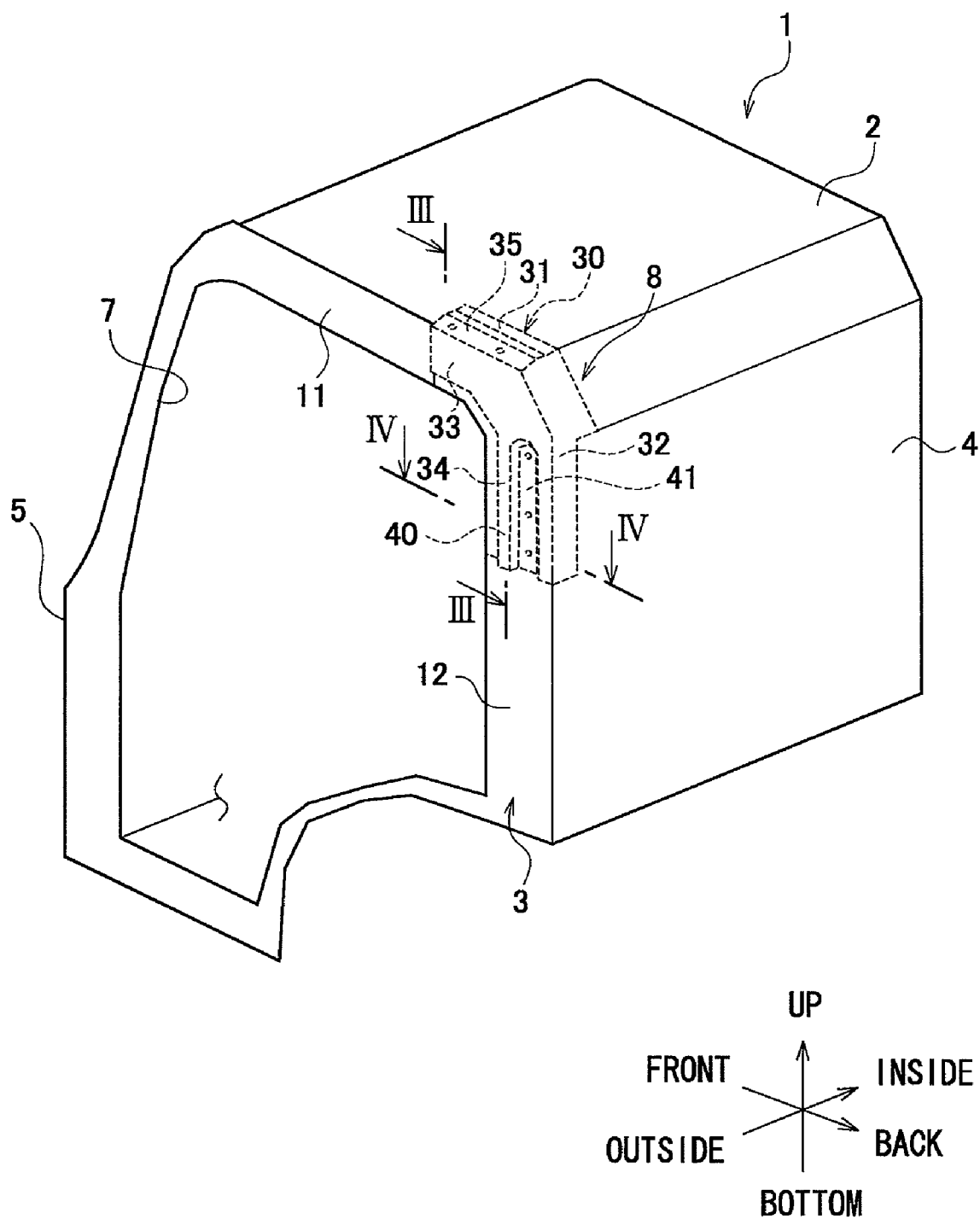
FIG. 1 is a perspective view of a cab with a reinforcement member attached thereto, according to an embodiment of the present invention, when viewed obliquely from the rear.

1 Cab
2 Roof panel
3 Side panel outer section

4 Back panel
5 Front panel
6 Rear pillar inner section
9 Closed space
10 Side panel outer top surface
11 Side panel outer upper side
12 Rear pillar outer side
13 Rear pillar outer rear surface
14 Rear pillar outer front surface
30 Reinforcement member
31 Top surface
32 Back surface
33 First side
34 Second side
35 Air deflector attaching portion (first attaching portion)
37 Air deflector (attaching component)
40 Base
41 Seatbelt anchor attaching portion (second attaching portion)
42 Seatbelt anchor

BEST MODE FOR CARRYING OUT THE INVENTION

Figure 2:
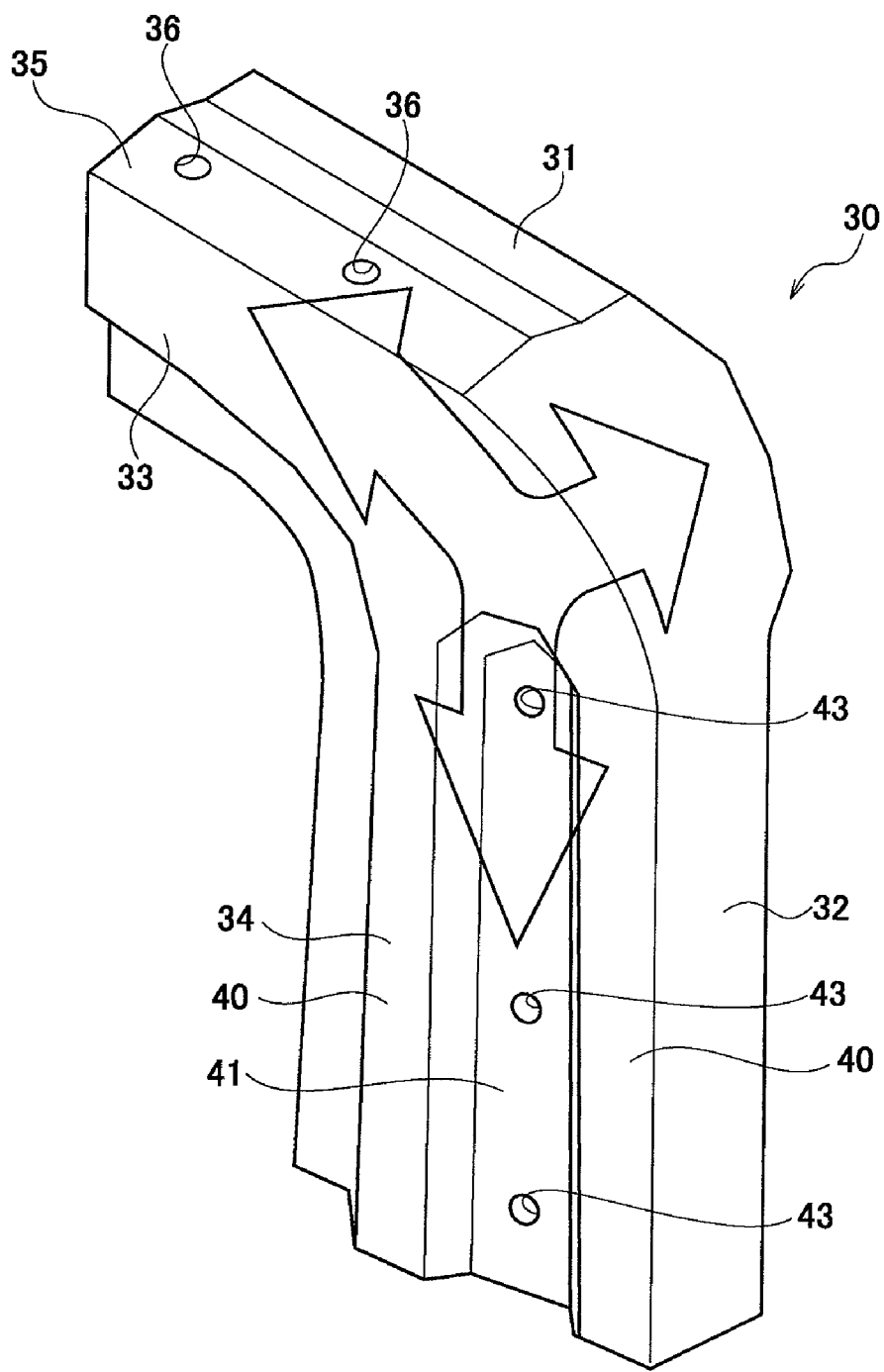
FIG. 2 is a perspective view of the reinforcement member when viewed obliquely from the rear.
Figure 2:
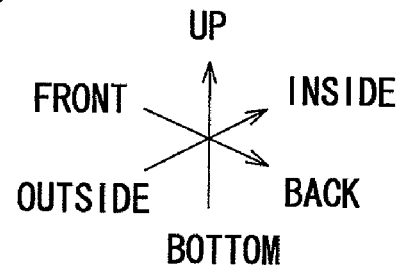
Figure 3:
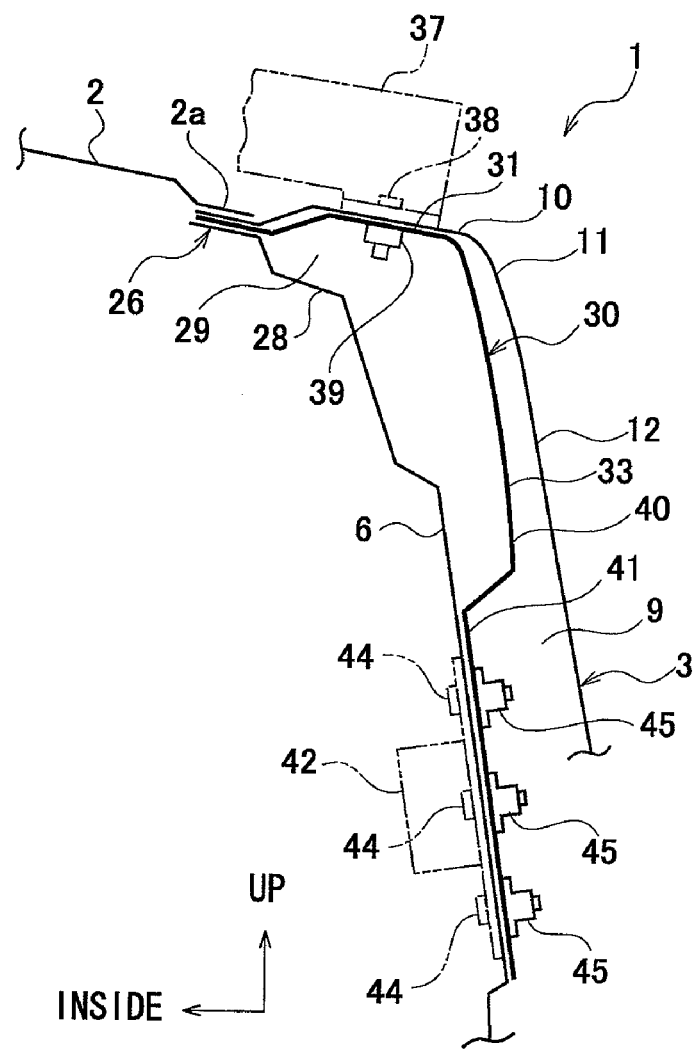
FIG. 3 is a cross section cut along line III-III of FIG. 1.
Figure 4:
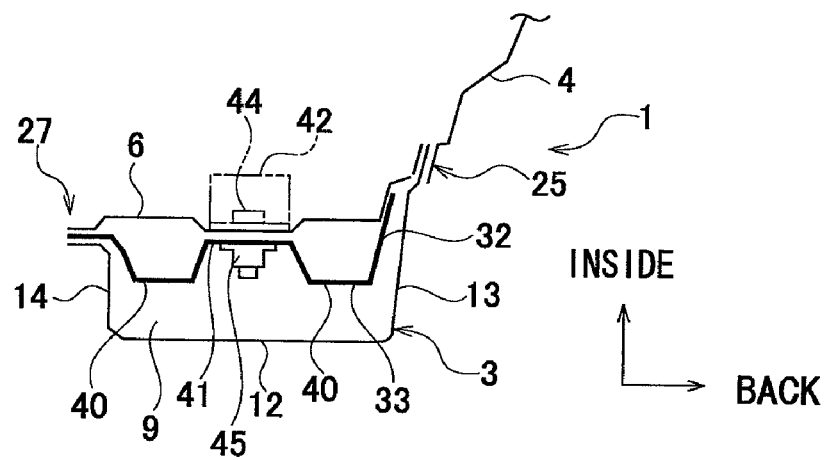
FIG. 4 is a cross section cut along line IV-IV of FIG. 1.

An embodiment of a cab reinforcing structure according to the present invention is described forthwith based on the appended drawings. FIG. 1 is a perspective view of a cab with a reinforcement member attached thereto, according to an embodiment of the present invention, when viewed obliquely from the rear. FIG. 2 is perspective view of the reinforcement member when viewed obliquely from the rear. FIG. 3 cross section cut along line III-III of FIG. 1. FIG. 4 is a cross section cut along line IV-IV of FIG. 1. Note that in the following description, front-back direction denotes front and back in the vehicle traveling direction, and inside-outside direction denotes inside and outside in the vehicle width direction.

As shown in FIG. 1, the outer surface of a cab 1 is mostly constituted by a roof panel 2, a side panel outer section 3, a back panel 4, and a front panel 5. The side panel outer section 3 partitions a door opening 7. The side panel outer section 3, the back panel 4, and the front panel 5 are respectively connected to the roof panel 2. The back panel 4 and the front panel 5 are respectively connected to the side panel outer section 3.

A rear pillar inner section 6 (shown in FIG. 3) is attached on the inner side of a rear pillar part of the side panel outer section 3. A side panel inner section 28 (shown in FIG. 3) is attached on the inner side of upper part of the side panel outer section 3. The trailing edge of the side panel inner section 28 is connected to the leading edge of the top of the rear pillar inner section 6. A reinforcement member 30 is attached to a left rear corner portion 8 of the cab 1 as illustrated by dotted lines. Note that although not particularly illustrated, a side outer section is also connected to the roof panel 2 on the right side of the cab 1, and the reinforcement member 30 is attached in the same manner to the right rear corner of the cab 1.

Next, the structure of the left rear corner portion 8 of the cab 1 to which the reinforcement member 30 is attached is described in detail while referencing FIGS. 1, 3, and 4.

The side panel outer section 3 includes a side panel outer top surface 10, a side panel outer, upper side 11, a rear pillar outer side 12, a rear pillar outer rear surface 13, and a rear pillar outer front surface 14.

The inner edge of the side panel outer top surface 10 is joined to an outer edge 2a of the roof panel 2 and extends outward. The side panel outer upper side 11 bends downward from the outer edge of the side panel outer top surface 10, and the lower edge of the side panel outer upper side 11 partitions the top of the door opening 7.

The side panel inner section 28 is arranged facing the bottom of the side panel outer top surface 10 and the inner side of the side panel outer upper side 11, and a closed space 29 is formed by the side panel inner section 28, the side panel outer top surface 10 and the side panel outer upper side 11. The upper edge and the lower edge of the side panel inner section 28 are joined to the inner edge of the side panel outer top surface 10 and the lower edge of the side panel outer upper side 11, respectively.

The rear pillar outer side 12 continues in an approximate L shape from the back edge of the side panel outer upper side 11 extending downward. The leading edge of the rear pillar outer side 12 partitions the rear of the door opening 7. A rear pillar outer rear surface 13 bends and extends inward from the trailing edge of the rear pillar outer side 12. A rear pillar outer front surface 14 bends and extends inward from the leading edge of the rear pillar outer side 12.

The rear pillar inner section 6 is arranged facing the inner side of the rear pillar outer side 12, and the closed space 9 is formed between the rear pillar inner section 6 and the rear pillar outer side 12. The top of the closed space 9 continues to the back of a closed space 29. The leading edge of the rear pillar inner section 6 is joined to the leading edge of the rear pillar outer side 12, and the trailing edge of the rear pillar inner section 6 is joined to the trailing edge of the rear pillar outer side 12.

The back panel 4 stands along the vehicle width at the rear of the roof panel 2 and the side panel outer section 3. The upper edge of the back panel 4 is joined to the trailing edge of the roof panel 2. The outer edge of the back panel 4, the inner edges of the rear pillar outer rear surface 13, and the rear pillar inner section 6 are stacked together, resulting in a joined, stacked portion 25.

Next, the structure of the reinforcement member 30 is described while referencing FIGS. 2 through 4.

The reinforcement member 30 includes a top surface 31, a back surface 32, a first side 33, and a second side 34, which are integratedly formed as a single body.

The top surface 31 is arranged facing the bottom of the side panel outer top surface 10 within the closed space 29. The inner edge of the top surface 31, the outer edge 2a of the roof panel 2, the inner edge of the side panel outer top surface 10, and the upper edge of the side panel inner section 28 are stacked together, and resulting in a joined, stacked portion 26.

The back surface 32 is arranged facing the front surface of the rear pillar outer rear surface 13 within the closed space 9, and bends and extends downward from the trailing edge of the top surface 31. The top surface 31 and the back surface 32 are successive in a bent shape. The inner edge of the back surface 32 is joined to the rear pillar inner section 6. Note that the back surface 32 may be joined to the side panel outer section 3.

The first side 33 is arranged facing the inner surface of the side panel outer upper side 11 within the closed space 29, and bends and extends downward from the outer edge of the top surface 31.

The second side 34 is arranged in the closed space 9, facing the inner surface of the rear pillar outer side 12 and the rear surface (surface partitioning the closed space 9) of the rear pillar inner section 6, and bends and extends forward from the outer edge of the back surface 32. The inner edge of the rear pillar front surface 14 bends forward, and the front edge of the second side 34, the inner edge of the rear pillar outer front surface 14, and the front edge of the rear pillar inner section 6 are stacked together, resulting in a joined, stacked portion 27.

The top surface 31 includes an air deflector attaching portion (first attaching portion) 35 in which multiple bolt through-holes 36 are formed. The air deflector attaching portion 35 is adjacent to or is in contact with the bottom of the side panel outer top surface 10. An air deflector (attaching portion) 37 arranged on the top of the roof panel 2 is attached to the air deflector attaching portion 35 by bolts 38, which pass through the bolt through-holes 36, respectively, and nuts 39, which are screwed together to the bolts, respectively, and supported thereby.

The second side 34 includes a base 40 and a seatbelt anchor attaching portion (second attaching portion) 41. The base 40 is formed in approximately the same plane as the first side 33. The seatbelt anchor attaching portion 41 extends in an approximate U shape inward from the base 40 and has surface contact with the rear surface of the rear pillar inner section 6. Note that the seatbelt anchor attaching portion 41 may be joined to the rear pillar inner section 6.

Multiple bolt through-holes 43 are formed in the seatbelt anchor attaching portion 41. A trim is attached to the surface of the rear pillar inner section 6, and a seatbelt anchor 42 is arranged on the trim. Note that illustration of the trim is omitted in FIG. 3. The seatbelt anchor 42 is attached to the seatbelt anchor attaching portion 41 by bolts 44, which pass through the bolt through-holes 43, respectively, and nuts 45, which are screwed together to the bolts, respectively, and supported thereby.

According to this embodiment, the air deflector attaching portion 35 supports the air deflector 37 from below, and the seatbelt anchor attaching portion 41 supports the seatbelt anchor 42 from the side.

Here, the air deflector attaching portion 35 is reinforced by the first side 33 and the back surface 32. Moreover, the seatbelt anchor attaching portion 41 is reinforced by the base 40. Furthermore, the top surface 31, the back surface 32, the first side 33, and the second side 34 are integratedly formed as a single body, and the second side 34 and the base 40 are formed in approximately the same plane as the first side 33. Therefore, even if an inordinate burden is suddenly applied from the air deflector 37 and the seatbelt anchor 42, this burden may be dispersed in three directions of front and back, up and down, and vehicle width (left and right) and supported, and stress concentration may be suppressed. In addition, strong reinforcement of the corner portion 8 of the cab 1 is possible. Accordingly, effective reinforcement of the cab 1 is possible.

Moreover, since support of the air deflector 37, support of the seatbelt anchor 42, and reinforcement of the corner portion 8 may be carried out by a single reinforcement member 30, reduction in number of components and reduction in number of attachment processes is possible.

Note that while the example of attaching the air deflector 37 on the roof panel 2 has been given in the above-given embodiment, in the case of attaching another attaching component, for example, a roof cover such as a carrier, the air deflector attaching portion 35 shall be the attaching portion of the roof cover.

The description of this embodiment is merely an example of the present invention. Therefore, the present invention is not limited to the above-given embodiment. Various modifications not described herein are naturally possible without deviating from the technical scope of the present invention.

INDUSTRIAL APPLICABILITY

The present invention is applicable to various cab reinforcing structures.

The invention claimed is:

1. A vehicle reinforcing structure, which reinforces a cab using a reinforcement member, wherein
the cab comprises:
a roof panel;
a side panel outer section comprising a side panel outer top surface, which extends outward along the vehicle width and is joined to an outer edge of the roof panel in the vehicle width direction; a side panel outer upper side, which bends downward from an outer edge of the side panel outer top surface in the vehicle width direction and partitions the top of a door opening; a rear pillar outer side, which extends downward continuing from a back edge of the side panel outer upper side and partitions the rear of the door opening; and a rear pillar outer rear surface, which bends and extends inward from a trailing edge of the rear pillar outer side along the vehicle width;
a rear pillar inner section, which is arranged facing the inner side of the rear pillar outer side, forming a closed space with the rear pillar outer side, and fixed to the side panel outer section; and
a back panel, which stands along the vehicle width at the rear of the roof panel and the side panel outer section, and is joined to the trailing edge of the roof panel and to the inner edge of the rear pillar outer rear surface, wherein
the reinforcement member comprises:
a top surface, which is arranged facing the bottom of the side panel outer top surface and fixed to the side panel outer top surface;
a back surface, which is arranged facing the front surface of the rear pillar outer rear surface, fixed to at least either the side panel outer section or the rear pillar inner section, and bends and extends downward from the back edge of the top surface;
a first side, which is arranged facing the inner surface of the side panel outer upper side, bending and extending downward from the outer edge of the top surface along the vehicle width; and
a second side, which is arranged within the closed space, facing the inner surface of the rear pillar outer side, fixed to at least either the side panel outer section or the rear pillar inner section, and bends and extends forward from the outer edge of the rear surface;
the top surface, the rear surface, the first side, and the second side are integratedly formed as a single body;
the top surface includes a first attaching portion to which an attaching component arranged on top of the roof panel is attachable; and
the second side includes a base, which is formed in approximately the same plane as the first side, and a second attaching component, which is in contact with the rear pillar inner section protruding inward from the base in the vehicle width direction, and to which a seatbelt anchor arranged on the inner side of the rear pillar inner section is attachable.

* * * * *